E. H. W. WEIBULL.
APPARATUS FOR CALIBRATING ROLLERS FOR ANTIFRICTION ROLLER BEARINGS.
APPLICATION FILED JULY 1, 1920.

1,374,127.

Patented Apr. 5, 1921.
2 SHEETS—SHEET 1.

Inventor.
E.H.W. Weibull
By H. R. Kerslake.
Atty.

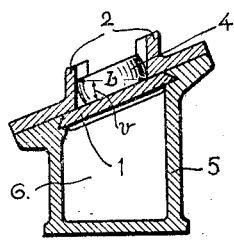
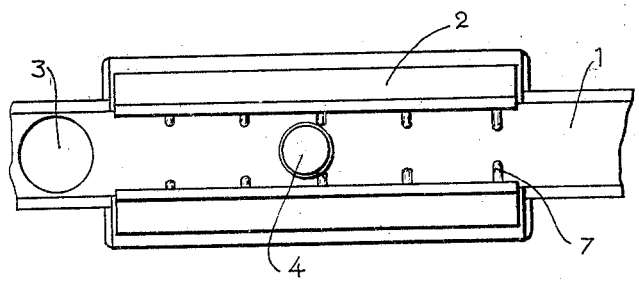
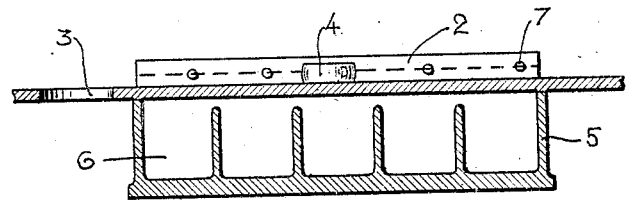

UNITED STATES PATENT OFFICE.

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

APPARATUS FOR CALIBRATING ROLLERS FOR ANTIFRICTION ROLLER-BEARINGS.

1,374,127. Specification of Letters Patent. Patented Apr. 5, 1921.

Application filed July 1, 1920. Serial No. 393,395.

*To all whom it may concern:*

Be it known that I, ERNST HJALMAR WALODDI WEIBULL, citizen of Sweden, residing at Gottenborg, in the county of Gottenborg and Bohus and State of Sweden, have invented certain new and useful Improvements in Improved Apparatus for Calibrating Rollers for Antifriction Roller-Bearings, of which the following is a specification.

The present invention has for its object an improved apparatus for calibrating diskshaped rollers with curved producer, which are intended to be used as rolling elements in antifriction roller bearings and which are provided with flat side surfaces.

Another object of this invention is to provide an apparatus to determine, if the radius of curvature of the curved producer of the operative surface of the roller is the proper one.

This invention further has for its object to provide a simple and easily operated apparatus for the above purpose.

Figure 1:
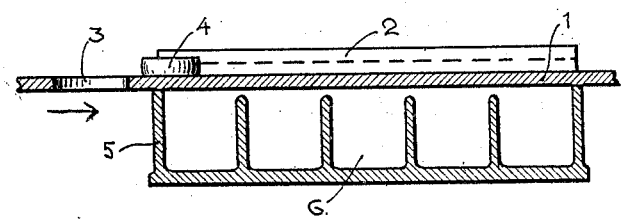
Figure 5:
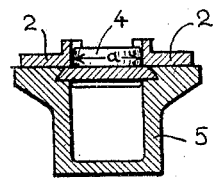
Figure 2:
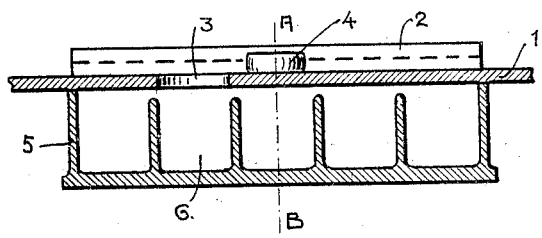
Figure 3:
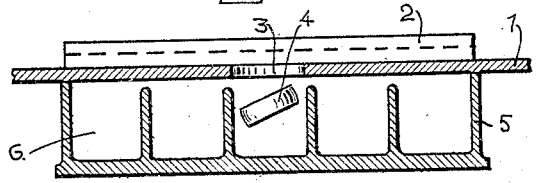
Figure 4:
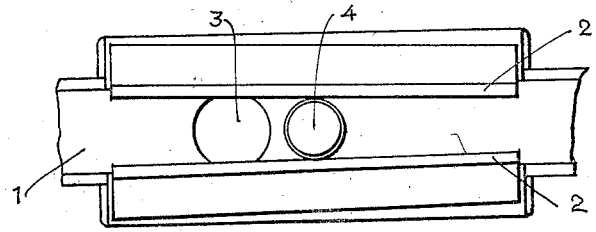

The apparatus is illustrated in the accompanying drawing in which Figures 1–3 illustrate in longitudinal sections elevations of the apparatus in different operating positions, Fig. 4 a top view of the apparatus in the operative position according to Fig. 2, Fig. 5 a section along the line A—A in Fig. 2, Fig. 6 a similar section of an apparatus for determining the radius of curvature of the producer of the operative surface of a roller, Fig. 7 a plan view and Fig. 8 a longitudinal section of another embodiment of a calibrating apparatus according to this invention.

In the drawing 1 denotes a slide consisting of a horizontally arranged plan plate with a throughgoing, cylindrical hole 3 of a larger diameter than the diameter of the largest rollers, for which the apparatus is intended to be used. The slide 1 is reciprocable in its length direction, said movement being effected by means of any suitable driving mechanism, not shown in the drawing, as it can be clearly understood by anybody. By every forward movement in the direction as shown by the arrow in Fig. 1 the slide 1 will bring along a roller 4 as this roller rests on its one-flat side-surface upon the slide 1 in front of the hole 3. The calibrating device comprises two vertical rulers 2 on top of the slide 1, independent of same, so that they do not take part in the movements of the slide, and arranged so that the distance between them decreases in the just mentioned feeding direction of the slide 1. When the roller 4 by means of the slide 1 is moved forward within the boundaries of the rulers 2, its movement will in a certain position be stopped by said rulers, as is shown in Figs. 2 and 4, this position being independent of the distance between the rulers and the diameter of the roller. The slide 1 however will continue its movement in the direction of the arrow in Fig. 1 and as a consequence the hole 3 finally will reach the roller 4 and having come wholly beneath the roller (Fig. 3), the roller will drop down through it and be collected into a receiver 5 placed below the slide. This receiver may in the direction of the movement of the slide 1 be subdivided in partitions or boxes 6, so that rollers 4, which on account of their different sizes of diameter are stopped at different places between the rulers 2 will drop down into different boxes or partitions 6 of the said receiver and result in a careful calibrating of the rollers.

When the slide 1 reaches its end position it returns to the starting position and repeats its stroke bringing along a new roller 4 in gear with the rulers 2 and the hole 3. The supply of rollers down to the slide 1 is performed by means of any suitable feeding mechanism, which is not shown in the drawing as it does not belong to this invention.

If the size of the radius of curvature of the producer of the operative surface of the rollers 4 is to be measured the above described apparatus can be used by simply giving the slide 1 an inclination $v$ (Fig. 6) to the horizontal in a lateral direction at right angle to the direction of the reciprocating movement of the slide, while the rulers 2 are retained in their vertical position as shown in Fig. 6. The angle $v$ is equal to the angle between the side-surfaces of the roller 4 and the diagonal $b$ from edge to edge of the roller (Fig. 6).

In using this modified embodiment of the apparatus the rollers 4 firstly are calibrated with regard to their diameter in the way described above and after this calibrating rollers of the same diameter are treated in an apparatus with the slide 1 inclined as shown in Fig. 6. Because the length of the diagonal b, is dependent of the size of the radius of curvature of the producer of the rollers the rollers now will be calibrated also in this respect resulting therein that rollers, having the proper size and shape, are collected in each special box or partition of the receiver.

It is evident that the rulers 2 can be substituted by other convenient measuring implements, without interfering with the scope of the invention. For instance the rulers can be parallel, as shown in Figs. 7 and 8, and provided with a plurality of pairs of measuring elements 7 of different length projecting against each other, between which the rollers have to pass. In order to facilitate the feeding operation of the slide 1, this also can be somewhat inclined in direction of the measuring device, viz. in the direction just indicated by the arrow in Fig. 1.

Having now fully described my invention, what I claim as new, and desire to secure by Letters Patent, is:—

1. An apparatus for assorting disks comprising a supporting means provided with an aperture through which a disk supported by said means may pass and converging means coöperating with the other means and designed to engage the opposite sides of a disk supported by the supporting means, one of said means being movable relatively to the other means for the purpose of bringing the disk and aperture into alinement.

2. An apparatus for assorting disks comprising a movable supporting member upon which a disk is designed to rest with one of its flat sides engaging the support member, said supporting member being provided with an aperture of sufficient size to permit the disk to pass through the same, converging surfaces extending perpendicularly to the axis of movement of said supporting member and designed to be engaged by the opposite sides of the disk when the supporting member moves relatively to the converging surfaces, and means arranged below the supporting member and provided with partitions, said means being designed to receive the disks discharged through said aperture.

3. An apparatus for assorting disks comprising a longitudinally movable supporting plate provided with an aperture, a plurality of rulers having oppositely disposed converging surfaces between which a disk carried by the supporting plate is moved until opposite sides of the disk contact with the opposite converging surfaces, and a receptacle arranged beneath the supporting plate and provided with partitions forming pockets designed to receive disks falling through said aperture.

4. An apparatus of the kind defined by claim 3 in which the supporting plate is arranged at an angle relatively to the horizontal.

In testimony whereof I have affixed my signature.

ERNST HJALMAR WALODDI WEIBULL.